(12) United States Patent
Oku et al.

(10) Patent No.: US 8,655,188 B2
(45) Date of Patent: Feb. 18, 2014

(54) DRIVER AND OPTICAL TRANSMISSION APPARATUS

(75) Inventors: Hideki Oku, Kawasaki (JP); Yukito Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 13/209,810

(22) Filed: Aug. 15, 2011

(65) Prior Publication Data

US 2012/0045223 A1    Feb. 23, 2012

(30) Foreign Application Priority Data

Aug. 18, 2010 (JP) ................. 2010-183039

(51) Int. Cl.
*H04B 10/04* (2011.01)
*H04B 10/12* (2011.01)

(52) U.S. Cl.
USPC ............ 398/193; 398/192; 398/195; 398/198

(58) Field of Classification Search
USPC .................................. 398/192–198
See application file for complete search history.

(56) References Cited

U.S. PATENT DOCUMENTS

| | | | |
|---|---|---|---|
| 6,897,685 B2 | 5/2005 | Sato | |
| 2002/0175729 A1* | 11/2002 | Cyrusian | 327/274 |
| 2007/0040631 A1* | 2/2007 | Blodgett | 333/117 |
| 2009/0196630 A1* | 8/2009 | Ishaug et al. | 398/193 |

FOREIGN PATENT DOCUMENTS

JP    2004-88693 A    3/2004

\* cited by examiner

*Primary Examiner* — Daniel Dobson
(74) *Attorney, Agent, or Firm* — Fujitsu Patent Center

(57) ABSTRACT

A driver circuit includes a plurality of delay circuits and an inverter. The plurality of delay circuits delay branched driving signals. The inverter inverts at least one of the branched driving signals. At least one of the plurality of delay circuits is at least one variable delay circuit delaying a variable amount of delay. The output driving signal is output by combining the inverted signal of the branched driving signal output via at least one inverter and at least one non-inverted signal of the branched driving signals output from the delay circuits.

12 Claims, 19 Drawing Sheets

ND OPTICAL TRANSMISSION APPARATUS

DRIVER AND OPTICAL TRANSMISSION APPARATUS

CROSS-REFERENCE TO RELATED APPLICATIONS

This application is based upon and claims the benefit of priority of the prior Japanese Patent Application No. 2010-183039, filed on Aug. 18, 2010, the entire contents of which are incorporated herein by reference.

FIELD

Embodiments discussed herein relate to drivers and optical transmission apparatuses.

BACKGROUND

For example, with a dramatic improvement in performance of central processing units (CPUs) in high-end servers, the speed of data transmission between racks, between boards, and in a board has been increasing recently. In such a circumstance, optical interconnect technology capable of providing faster data transmission has been discussed since conventional technology for increasing the speed with electrical wirings is approaching its limit.

To realize high-speed optical interconnect, a technique for driving a light-emitting element at high speed is used, for example. When the light-emitting element is driven at high speed, waveform distortion occurs because of relaxation oscillations and bandwidth limitation of the light emitting element and transmission quality decreases. As a countermeasure for this, pre-emphasis is known in which a rising part and a falling part of a driving signal of the light-emitting element is in advance corrected (emphasized or suppressed). For example, a driver is known that splits a driving signal, provides a delay difference to the split driving signals, and combines (adds or subtracts) the driving signals (see, for example, Japanese Unexamined Patent Application Publication No. 2004-88693).

SUMMARY

According to an aspect of the invention, a driver circuit includes a plurality of delay circuits and an inverter. The plurality of delay circuits delay branched driving signals. The inverter inverts at least one of the branched driving signals. At least one of the plurality of delay circuits is at least one variable delay circuit delaying a variable amount of delay. The output driving signal is output by combining the at least one inverted signal of the branched driving signal output via the inverter and at least one non-inverted signal of the branched driving signals output from the delay circuits.

Advantages of the invention will be realized and attained via the elements and combinations particularly pointed out in the claims. It is to be understood that both the foregoing general description and the following detailed description are exemplary and explanatory and are not restrictive of the invention, as claimed.

DESCRIPTION OF EMBODIMENTS

It is unfortunately difficult with the aforementioned conventional technology to flexibly compensate various response characteristics of a target to be driven because of difficulty in flexibly shaping the driving signal. For example, there may be a method for changing a waveform of a driving signal by changing a combination of inverting and non-inverting amplifiers for amplifying respective split driving signals. However, in electric circuits that operate in high speed, it is difficult to switch between inversion and non-inversion of the amplifiers during adjustment or operation. Accordingly, inverting amplifiers and non-inverting amplifiers are selectively mounted for each target to be driven, for example, at the time of production. This unfortunately increases production cost.

Embodiments of the disclosed technology will be described in detail below with reference to the attached drawings.

Embodiments

Example of Configuration of Driver

Figure 1:
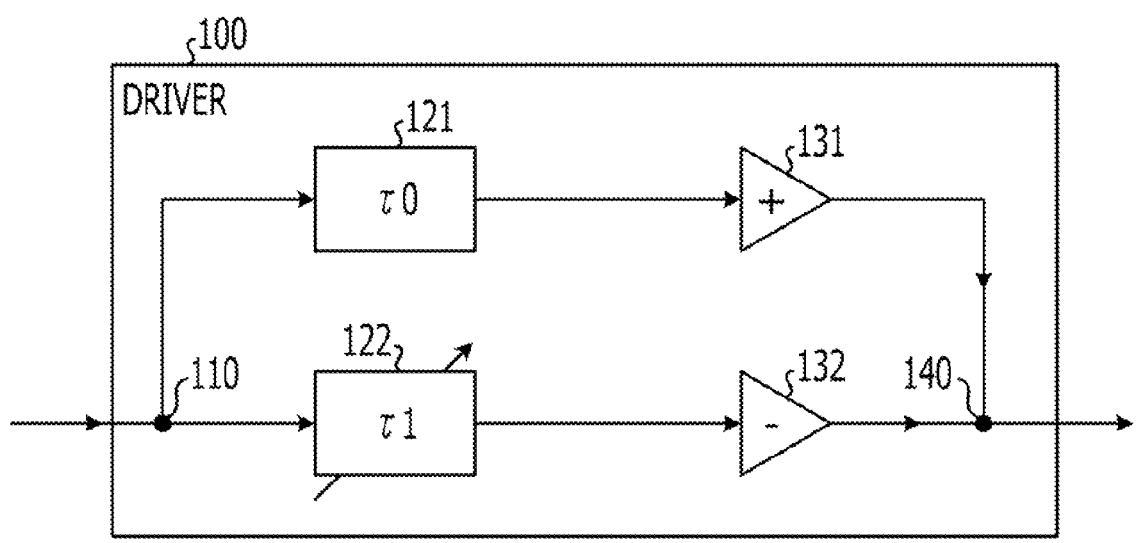
FIG. 1 is a diagram illustrating a first example of a configuration of a driver according to an embodiment.

FIG. 1 is a diagram illustrating a first example of a configuration of a driver according to an embodiment. A driver 100 illustrated in FIG. 1 shapes of a driving signal for driving, for example, a light-emitting element (see, for example, FIG. 7). More specifically, driver 100 includes a splitter 110, delays 121 and 122, amplifiers 131 and 132, and a combiner 140.

A driving signal for driving a target is input to the splitter 110. The driving signal may be a single-ended signal or may be a differential signal including a positive-phase signal and a negative-phase signal. The splitter 110 splits the input driving signal and outputs each split driving signal to the corresponding delays 121 and 122.

The delay 121 delays the driving signal output from the splitter 110 by a fixed amount of delay $\tau 0$ ($\tau 0 > 0$) and outputs the delayed driving signal to the amplifier 131. The delay 122 delays the driving signal output from the splitter 110 by an amount of delay $\tau 1$ ($\tau 1 > 0$ and $\tau 1 \neq \tau 0$) and outputs the delayed driving signal to the amplifier 132.

The delay 122 is a variable delay having the variable amount of delay $\tau 1$. A variable range of the amount of delay $\tau 1$ may be designed so that the minimum value is smaller than the amount of delay $\tau 0$ and the maximum value is larger than the amount of delay $\tau 0$. With this configuration, a magnitude relation between the amounts of delay of the split driving signals can be changed by adjusting the amount of delay $\tau 1$ and order of the driving signals can be switched.

The amplifier 131 is a non-inverting amplifier (+) that amplifies the driving signal output from the delay 121 without inverting the signal. The amplifier 131 outputs the non-inverted amplified driving signal to the combiner 140. The amplifier 132 serves as an inverter that inverts a driving signal. More specifically, the amplifier 132 is an inverting amplifier (−) that inverts and amplifies the driving signal output from the delay 122. The amplifier 132 outputs the inverted amplified driving signal to the combiner 140.

The combiner 140 combines the driving signal output from the amplifier 131 with the driving signal output from the amplifier 132. For example, the combiner 140 is an adder for combining the driving signals by performing addition or subtraction. The adder may be a subtracter, because adding X to Y is equal to subtracting −X from Y. A description will be given below for a case where the combiner 140 is an adder for combining the driving signals by adding the driving signals. The combiner 140 outputs the combined driving signal. In this way, the driver 100 can shape the input driving signal and output the shaped driving signal. The driving signal output from the driver 100 is input to, for example, a light-emitting element.

With the above configuration, the inverted driving signal and the non-inverted driving signal are input to the combiner 140. Additionally, the order of the driving signals input to the combiner 140 can be changed by adjusting the amount of delay $\tau 1$ of the delay 122. The order of the driving signals equates to, for example, which driving signal has a larger amount of delay. In this way, the driver 100 can flexibly shape the driving signal output from the combiner 140.

Although the configuration of the driver 100 in which the amplifier 131 is disposed downstream of the delay 121 has been described, the amplifier 131 may be disposed upstream of the delay 121. Similarly, the configuration in which the amplifier 132 is disposed downstream of the delay 122 has been described but the amplifier 132 may be disposed upstream of the delay 122.

Also, the description has been given for the configuration of the driver 100 in which the delay 121 is a fixed delay and the delay 122 is a variable delay. However, both the delays 121 and 122 may be variable delays. That is, an amount of delay of at least one of a plurality of delays (i.e., the delays 121 and 122) may be set variable.

Additionally, the configuration of the driver 100 in which the amplifier 131 is a non-inverting amplifier and the amplifier 132 is an inverting amplifier has been described. However, the amplifier 131 may be an inverting amplifier, whereas the amplifier 132 may be a non-inverting amplifier. In this case, a driving signal amplified by the amplifier 131 is inverted, whereas a driving signal amplified by the amplifier 132 is not inverted. That is, at least one of split driving signals may be inverted.

Figure 2:
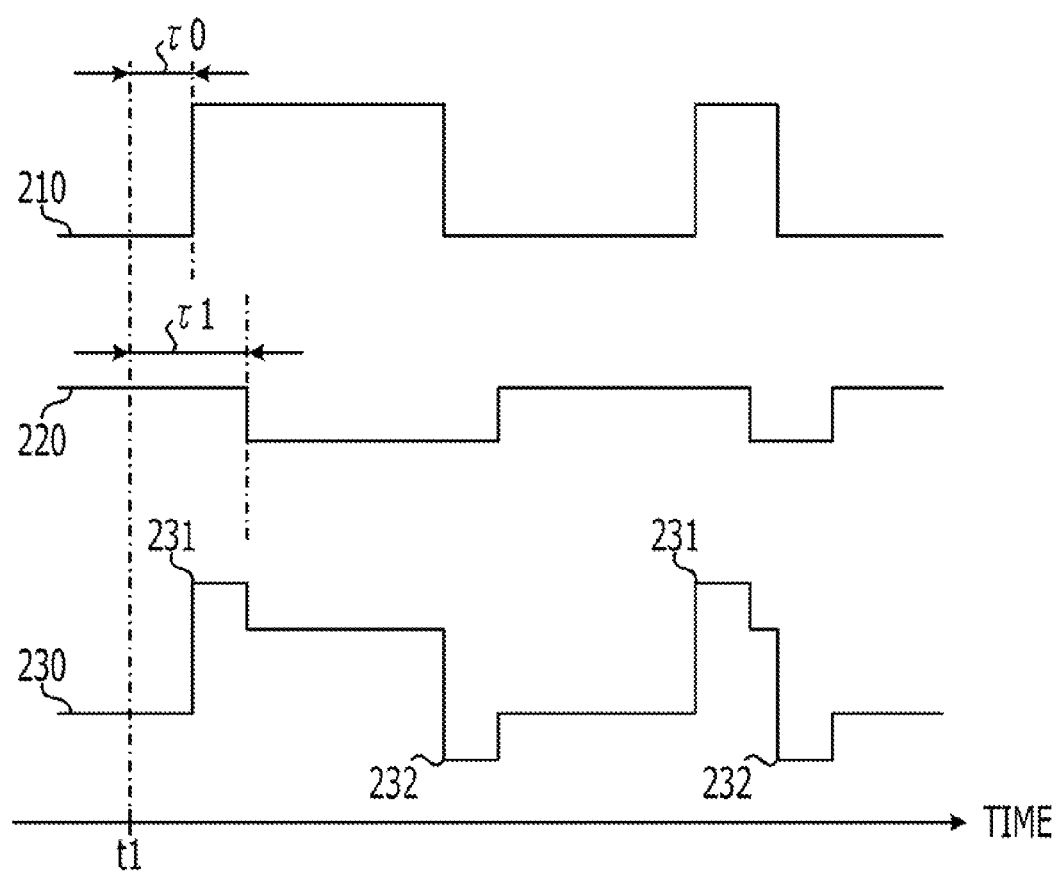
FIG. 2 is a diagram illustrating a first example of driving signals shaped with the first example of the configuration of the driver.

FIG. 2 illustrates a first example of driving signals shaped in the first configuration example of the driver 100. Referring to FIG. 2, a horizontal axis represents time. Driving signals 210, 220, and 230 illustrated in FIG. 2 indicate waveforms of the driving signals at the respective points of the driver 100 illustrated in FIG. 1. The driving signal 210 (non-inverted) is output from the amplifier 131 to the combiner 140. The driving signal 220 (inverted) is output from the amplifier 132 to the combiner 140. The driving signal 230 is output from the combiner 140.

Time t1 represents one timing of a rising part of the driving signal input to the driver 100. The driving signal 210 is provided with the amount of delay $\tau 0$ by the delay 121. The driving signal 210 is also amplified by the amplifier 131 without being inverted. The driving signal 220 is provided with the amount of delay $\tau 1$ by the delay 122 and is also inverted and amplified by the amplifier 132. Additionally, the driving signal 220 is amplified by the amplifier 132 by an amount smaller than that of the driving signal 210.

In the example illustrated in FIG. 2, the amount of delay $\tau 1$ of the delay 122 is adjusted to be larger than the amount of delay $\tau 0$ of the delay 121. Accordingly, the driving signal 220 is input to the combiner 140 after the driving signal 210. Since the driving signals are input to the combiner 140 in order of the driving signal 210 and the driving signal 220, the driving signal 230 output from the combiner 140 has a waveform with emphasized rising parts 231 and emphasized falling parts 232.

Figure 3:
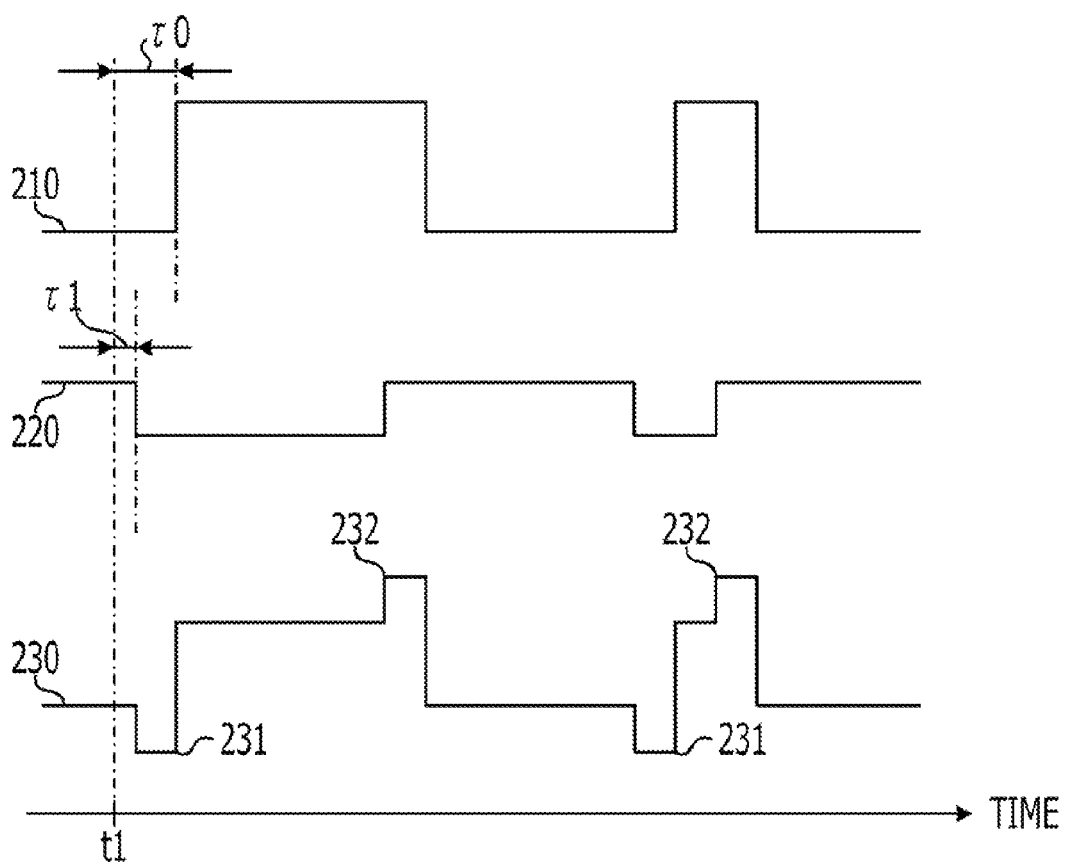
FIG. 3 is a diagram illustrating a second example of driving signals shaped with the first example of the configuration of the driver.

FIG. 3 is a diagram illustrating a second example of driving signals shaped in the first configuration example of the driver 100. Referring to FIG. 3, like references are attached to parts similar to those illustrated in FIG. 2 and a description thereof is omitted. In the example illustrated in FIG. 3, the amount of delay $\tau 1$ of the delay 122 is adjusted to be smaller than the amount of delay $\tau 0$ of the delay 121. Accordingly, the driving signal 210 is input to the combiner 140 after the driving signal 220. Since the driving signals are input to the combiner 140 in order of the driving signal 220 and the driving signal 210, the driving signal 230 output from the combiner 140 has a waveform with suppressed rising parts 231 and suppressed falling parts 232.

As illustrated FIGS. 2 and 3, the order of the driving signal 210 (non-inverted) and the driving signal 220 (inverted) input to the combiner 140 can be switched by adjusting the amount of delay $\tau 1$ of the delay 122 to change a magnitude relation between the amounts of delay $\tau 0$ and $\tau 1$. In this way, the driver 100 can flexibly shape the driving signal 230 output from the combiner 140 so that the driving signal 230 has a waveform in which the rising parts 231 and the falling parts 232 are emphasized or suppressed.

Figure 4:
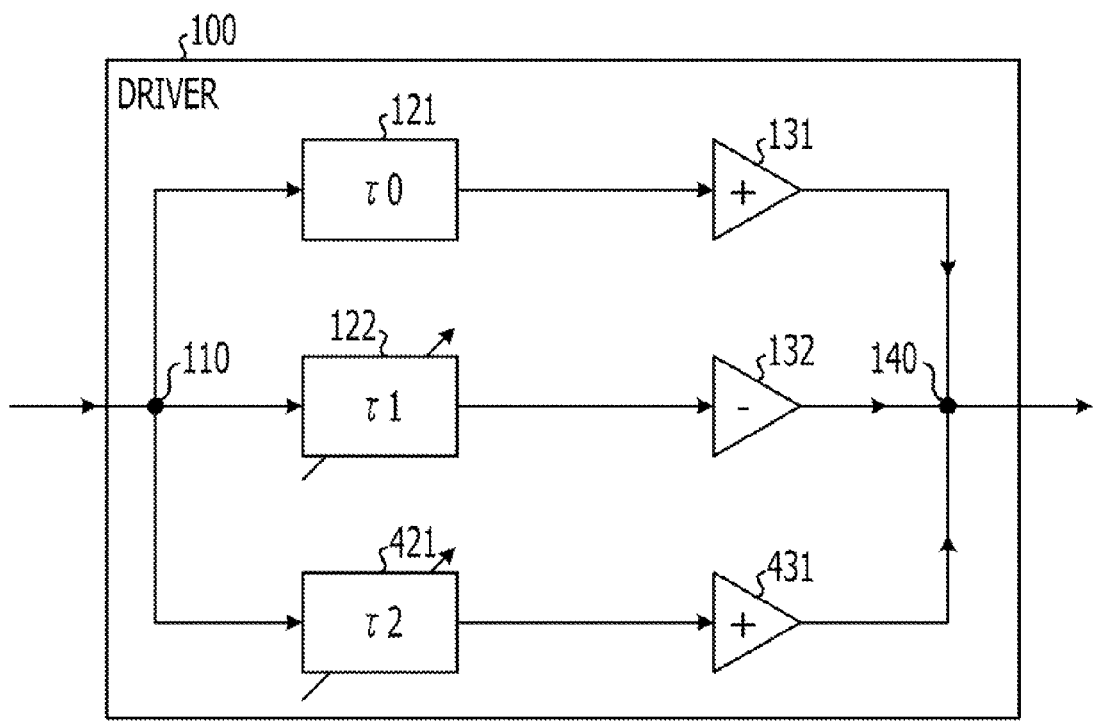
FIG. 4 is a diagram illustrating a second example of a configuration of a driver according to an embodiment.

FIG. 4 illustrates a second example of a configuration of a driver according to an embodiment. Referring to FIG. 4, like references are attached to a configuration similar to that illustrated in FIG. 1 and a description thereof is omitted. As illustrated in FIG. 4, a driver 100 may include a delay 421 and an amplifier 431 in addition to the configuration of the driver 100 illustrated in FIG. 1. A splitter 110 illustrated in FIG. 4 splits a driving signal into three signals and outputs each split driving signal to corresponding delays 121, 122, and 421.

The delay 421 delays the driving signal output from the splitter 110 by an amount of delay $\tau 2$ ($\tau 2 > 0$ and $\tau 1 \neq \tau 2 \neq \tau 0$) and outputs the delayed driving signal to the amplifier 431. Additionally, the delay 421 is a variable delay having the variable amount of delay $\tau 2$. The amplifier 431 is a non-inverting amplifier (+) that amplifies the driving signal output from the delay 421 without inverting the signal. The amplifier 431 outputs the non-inverted amplified driving signal to a combiner 140. The combiner 140 combines the driving signals output from the amplifiers 131, 132, and 431.

Although the configuration of the driver 100 in which the amplifier 431 is disposed downstream of the delay 421 has been described, the amplifier 431 may be disposed upstream of the delay 421. Additionally, the configuration of the driver 100 in which the delay 421 is a variable delay has been described. However, the delay 421 may be a fixed delay. That is, an amount of delay of at least one of a plurality of delays (i.e., the delays 121, 122, and 421) may be set variable.

Additionally, the description has been given for the configuration of the driver 100 in which the amplifier 431 is a non-inverting amplifier but the amplifier 431 may be an inverting amplifier in which case the driving signal amplified by the amplifier 431 would be inverted. At least one of the split driving signals may be inverted. In FIG. 4, the split driving signal output from the amplifier 132 is inverted.

Figure 5:
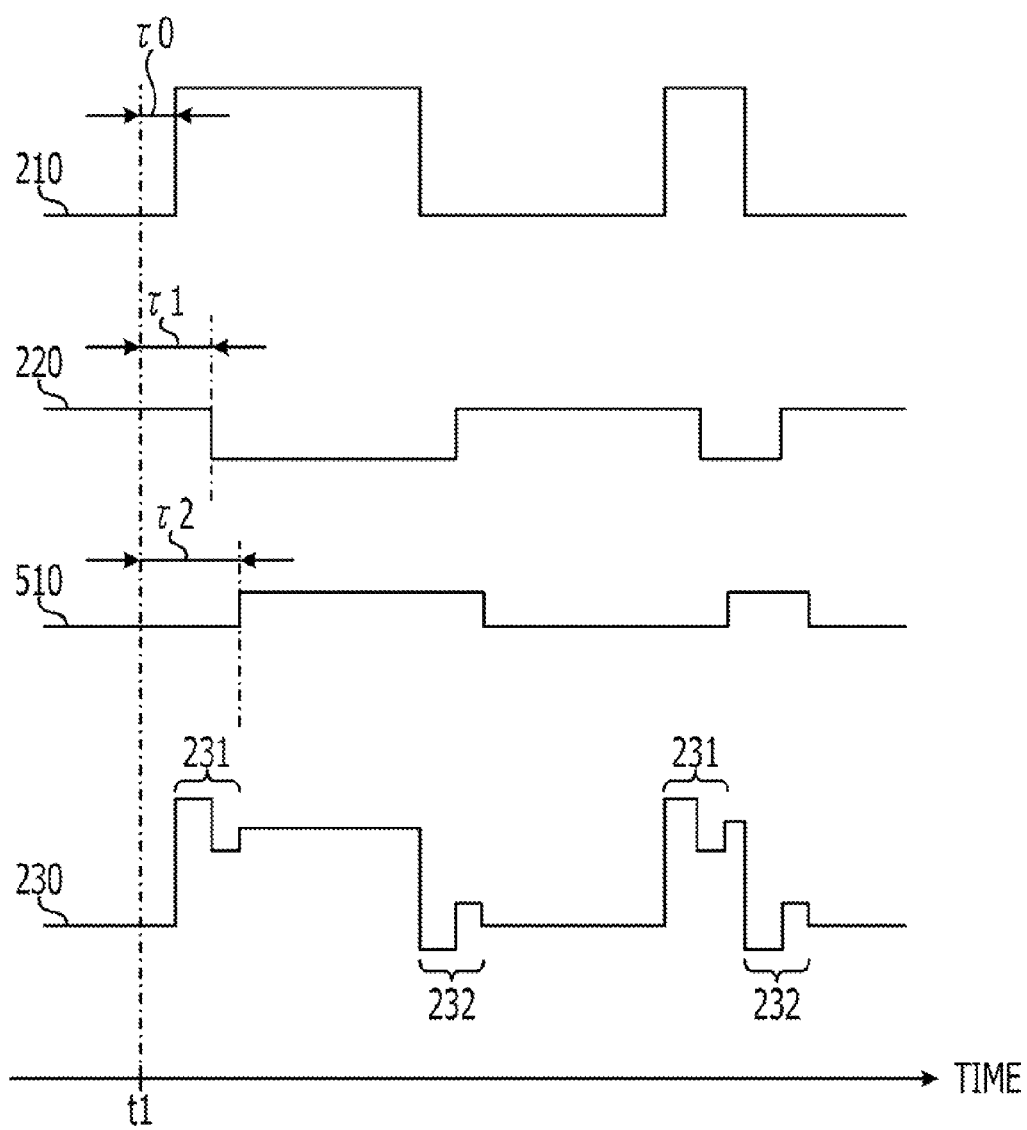
FIG. 5 is a diagram illustrating a first example of driving signals shaped with the second example of the configuration of the driver.

FIG. 5 is a diagram illustrating a first example of driving signals shaped in the second configuration example of the driver 100. Referring to FIG. 5, like references are attached to parts similar to those illustrated in FIG. 2 and a description thereof is omitted. Driving signals 210, 220, 230, and 510 illustrated in FIG. 5 indicate waveforms of the driving signals at respective points of the driver 100 illustrated in FIG. 4. The driving signal 510 illustrated in FIG. 5 is output from the amplifier 431 to the combiner 140.

In the example illustrated in FIG. 5, the amount of delay $\tau 1$ of the delay 122 is adjusted to be larger than the amount of delay $\tau 0$ of the delay 121 and the amount of delay $\tau 2$ of the delay 421 is adjusted to be larger than the amount of delay $\tau 1$ of the delay 122 ($\tau 0 < \tau 1 < \tau 2$). Accordingly, the driving signals are input to the combiner 140 in order of the driving signal 210, the driving signal 220, and the driving signal 510. As a result, the driving signal 230 output from the combiner 140 has a waveform with rising parts 231 and falling parts 232 that are emphasized and then suppressed.

Figure 6:
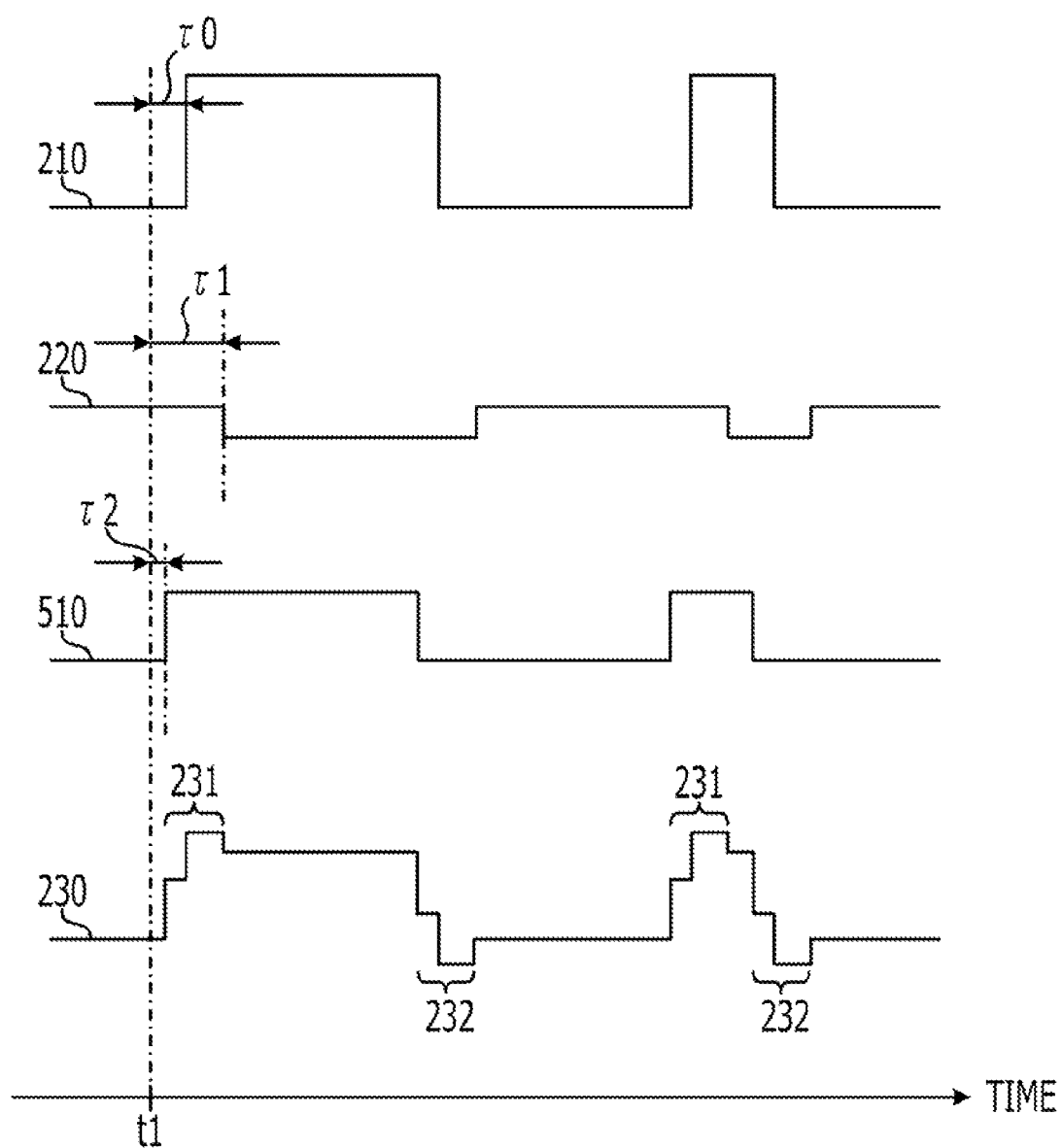
FIG. 6 is a diagram illustrating a second example of driving signals shaped with the second example of the configuration of the driver.

FIG. 6 is a diagram illustrating a second example of driving signals shaped in the second configuration example of the driver 100. Referring to FIG. 6, like references are attached to parts similar to those illustrated in FIG. 5 and a description is omitted. In the example illustrated in FIG. 6, the amount of delay $\tau 1$ of the delay 122 is adjusted to be larger than the amount of delay $\tau 0$ of the delay 121 and the amount of delay $\tau 2$ of the delay 421 is adjusted to be smaller than the amount of delay $\tau 0$ of the delay 121 ($\tau 2 < \tau 0 < \tau 1$). Accordingly, the driving signals are input to the combiner 140 in order of the driving signal 510, the driving signal 210, and the driving signal 220. As a result, the driving signal 230 output from the combiner 140 has a waveform with rising parts 231 and falling parts 232 that are suppressed and then emphasized.

The driver 100 may have a configuration in which the splitter 110 splits a driving signal into four or more signals and the split driving signals are provided with a delay difference and then combined. In this case, at least one of a plurality of delays has a variable amount of delay in the driver 100. Additionally, at least one of the split driving signals is inverted in the driver 100.

Example of Configuration of Optical Transmission Apparatus

Figure 7:
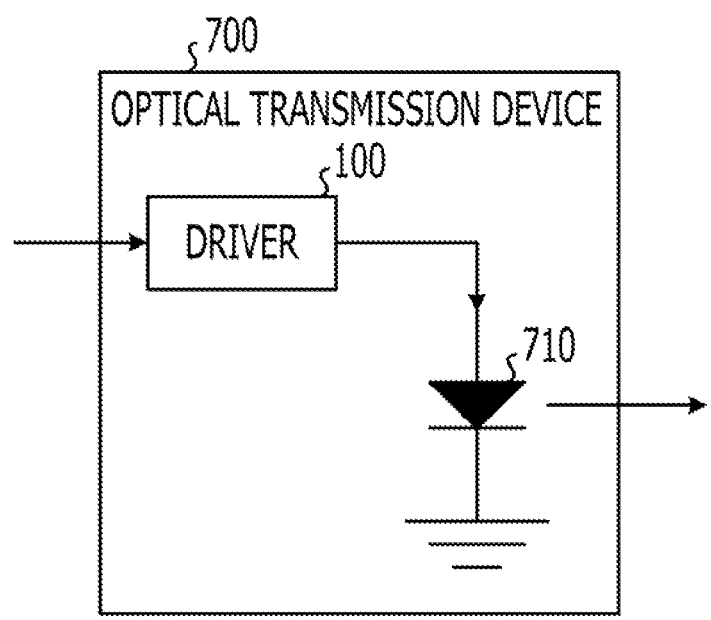
FIG. 7 is a diagram illustrating an example of a configuration of an optical transmission apparatus according to an embodiment.

FIG. 7 illustrates an example of a configuration of an optical transmission apparatus according to an embodiment. An optical transmission apparatus 700 illustrated in FIG. 7 transmits an optical signal that is based on an input driving signal. More specifically, the optical transmission apparatus 700 includes, for example, the driver 100 illustrated in FIG. 1 or 4 and a light-emitting element 710. The optical transmission apparatus 700 inputs a driving signal to the light-emitting element 710 to directly modulate the light-emitting element 710 and outputs an optical signal.

More specifically, the driver 100 shapes the driving signal input to the optical transmission apparatus 700 and outputs the shaped driving signal to the light-emitting element 710. The light-emitting element 710 is a laser diode (LD), such as a vertical cavity surface emitting laser (VCSEL), for example. One end of the light-emitting element 710 is coupled to the driver 100, whereas the other end is grounded. The light-emitting element 710 outputs an optical signal that is based on the driving signal output from the driver 100. With this configuration, the optical transmission apparatus 700 can transmit an optical signal based on the input driving signal.

Figure 8A:
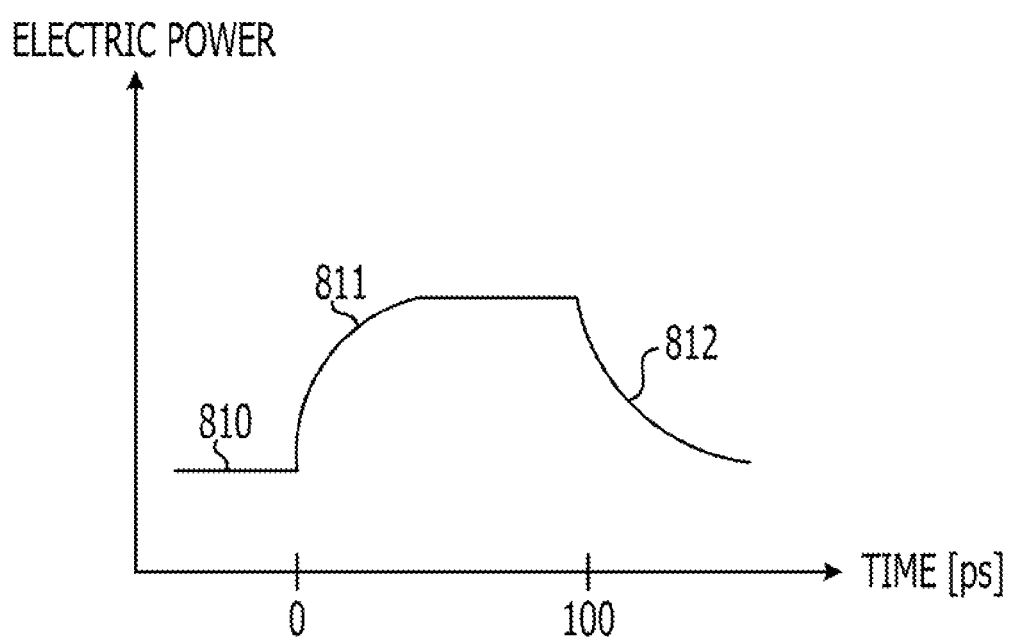
FIG. 8A is a diagram illustrating a first example of a characteristic of a light-emitting element.

FIG. 8A is a diagram illustrating a first example of a characteristic of a light-emitting element. Referring to FIG. 8A, a horizontal axis represents time (ps), whereas a vertical axis represents electric power of light. An optical signal 810 illustrated in FIG. 8A indicates a waveform of an optical signal output from the light-emitting element 710 when it is assumed that a rectangular driving signal (without pre-emphasis) is input to the light-emitting element 710 illustrated in FIG. 7. In the example illustrated in FIG. 8A, a rising part 811 and a falling part 812 of the optical signal 810 is dulled because of bandwidth limitation of the light-emitting element 710.

Figure 8B:
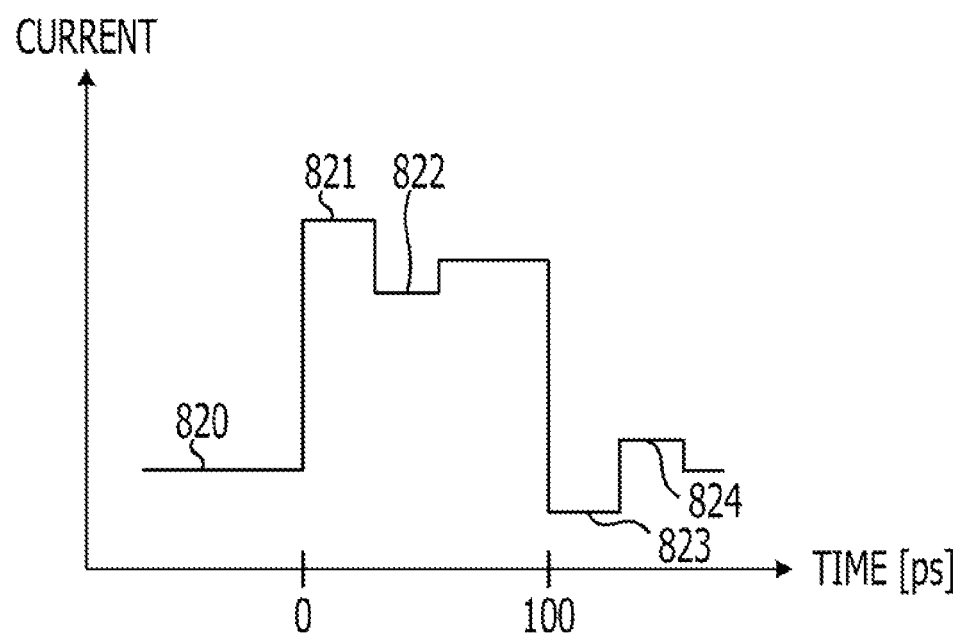
FIG. 8B is a diagram illustrating an example of a driving signal shaped for the first example of the characteristic of the light-emitting element.

FIG. 8B illustrates an example of a driving signal shaped for the first example of the characteristic of the light-emitting element. Referring to FIG. 8B, a horizontal axis represents time (ps), whereas a vertical axis represents current. When the light-emitting element 710 has the characteristic illustrated in FIG. 8A, the driver 100 having, for example, the configuration illustrated in FIG. 4 shapes the driving signal into a driving signal 820 illustrated in FIG. 8B. For example, like the driving signal 230 illustrated in FIG. 5, a rising part and a falling part of the driving signal 820 are emphasized and then suppressed.

An emphasized portion 821 indicates an emphasized point in the rising part of the driving signal 820. A suppressed portion 822 indicates a suppressed point in the rising part of the driving signal 820. Dullness in the rising part 811 of the optical signal 810 is compensated by the emphasized portion 821 of the driving signal 820, whereby quality of the optical signal output from the light-emitting element 710 can be improved. Additionally, the suppressed portion 822 of the driving signal 820 suppresses projection of the optical signal resulting from the emphasized portion 821, whereby the quality of the optical signal can be further improved.

An emphasized portion 823 indicates an emphasized point in the falling part of the driving signal 820. A suppressed portion 824 indicates a suppressed point in the falling part of the driving signal 820. Dullness in the falling part 812 of the optical signal 810 is compensated with the emphasized portion 823 of the driving signal 820, whereby the quality of the optical signal output from the light-emitting element 710 can be improved. Additionally, the suppressed portion 824 of the driving signal 820 suppresses projection of the optical signal resulting from the emphasized portion 823, whereby the quality of the optical signal can be further improved.

Figure 9A:
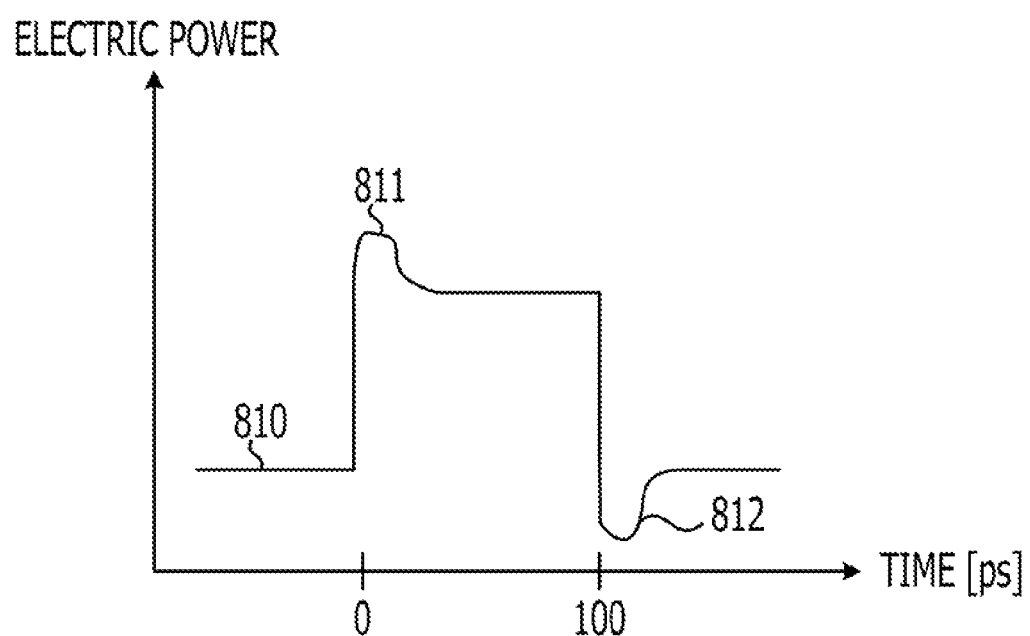
FIG. 9A is a diagram illustrating a second example of a characteristic of a light emitting element.

FIG. 9A illustrates a second example of a characteristic of a light-emitting element. Referring to FIG. 9A, like references are attached to parts similar to those illustrated in FIG. 8A and a description thereof is omitted. In the example illustrated in FIG. 9A, a rising part 811 and a falling part 812 of an optical signal 810 protrude because of characteristics, such as relaxation oscillations, of the light-emitting element 710.

Figure 9B:
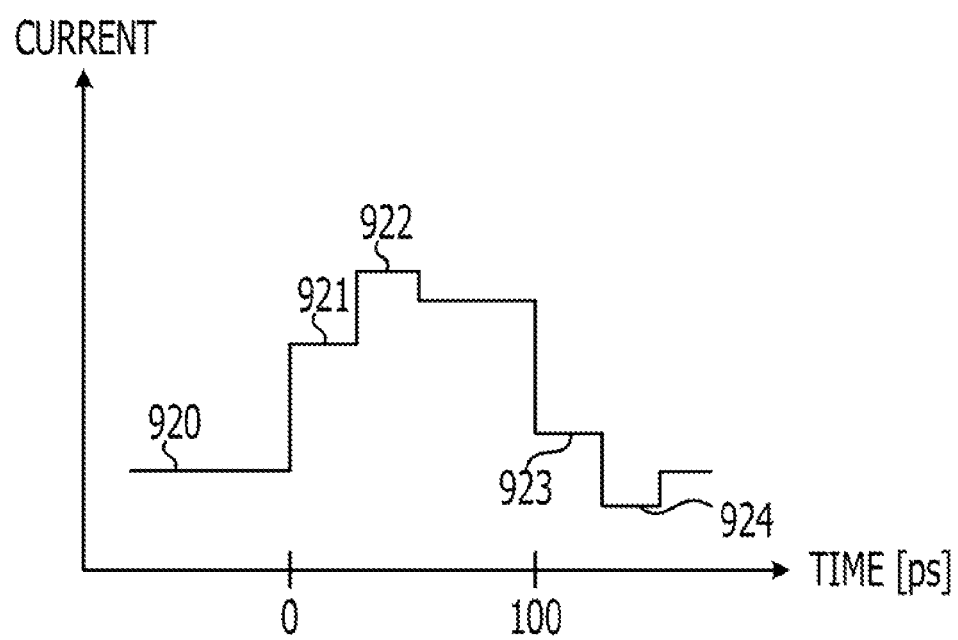
FIG. 9B is a diagram illustrating an example of a driving signal shaped for the second example of the characteristic of the light-emitting element.

FIG. 9B illustrates an example of a driving signal shaped for the second example of the characteristic of the light-emitting element. Referring to FIG. 9B, like references are attached to parts similar to those illustrated in FIG. 8B and a description thereof is omitted. When the light-emitting element 710 has the characteristic illustrated in FIG. 9A, the driver 100 having, for example, the configuration illustrated in FIG. 4 shapes the driving signal into a driving signal 920 illustrated in FIG. 9B. For example, like the driving signal 230 illustrated in FIG. 6, a rising part and a falling part of the driving signal 920 are suppressed and then emphasized.

A suppressed portion 921 indicates a suppressed point in the rising part of the driving signal 920. An emphasized portion 922 indicates an emphasized point in the rising part of the driving signal 920. The projection at the rising part 811 of the optical signal 810 is compensated by the suppressed portion 921 of the driving signal 920, whereby quality of the optical signal output from the light-emitting element 710 can be improved. Additionally, the emphasized portion 922 of the driving signal 920 suppresses dullness of the optical signal resulting from the suppressed portion 921, whereby the quality of the optical signal can be further improved.

A suppressed portion 923 indicates a suppressed point in the falling part of the driving signal 920. An emphasized portion 924 indicates an emphasized point in the falling part of the driving signal 920. Projection of the falling part 812 of the optical signal 810 is compensated with the suppressed portion 923 of the driving signal 920, whereby the quality of the optical signal output from the light-emitting element 710 can be improved. Additionally, the suppressed portion 924 of the driving signal 920 suppresses dullness of the optical signal resulting from the suppressed portion 923, whereby the quality of the optical signal can be further improved.

Example of Configuration of Variable Delay Circuit

Figure 10:
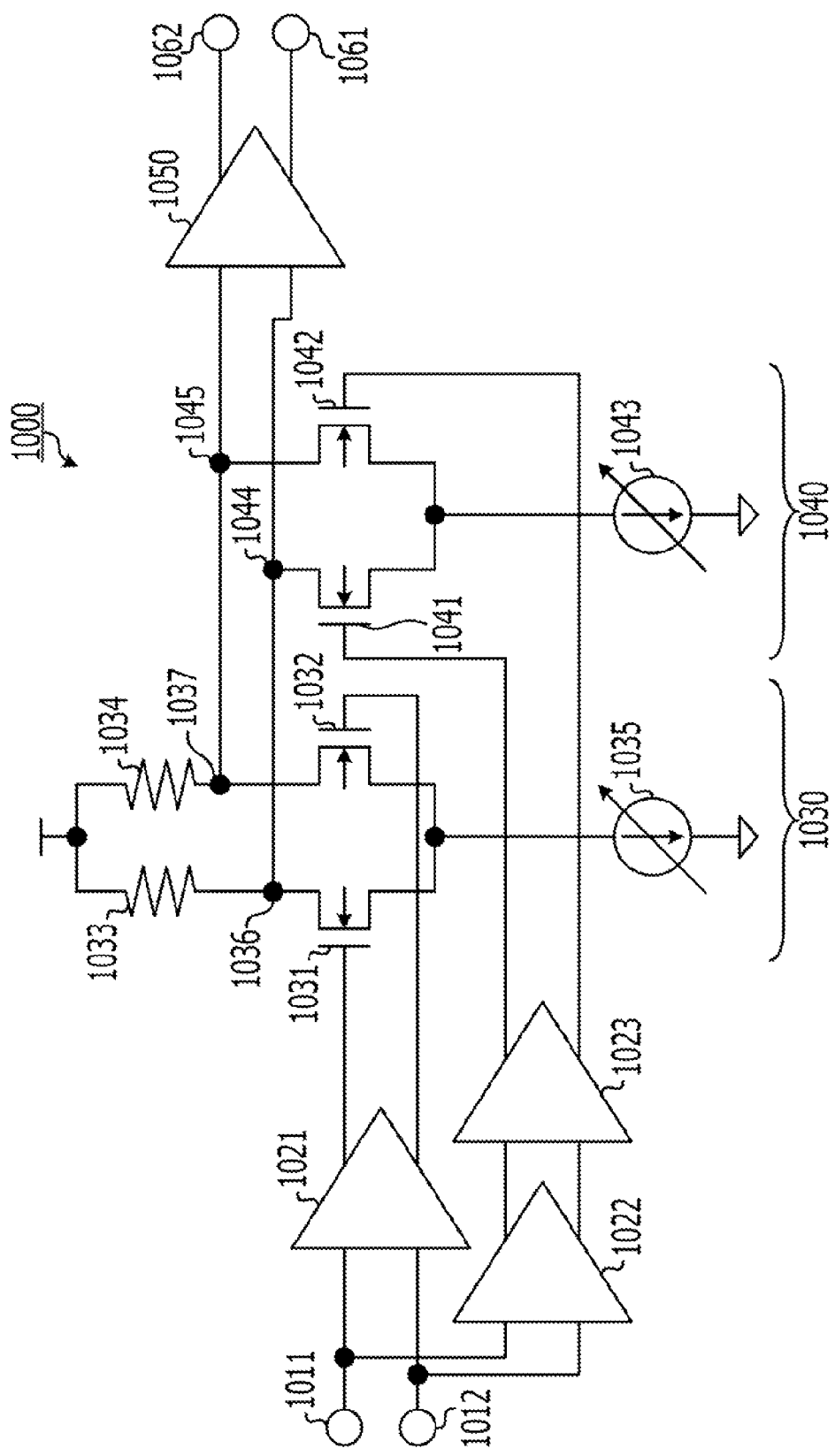
FIG. 10 is a diagram illustrating a first example of a configuration of a variable delay circuit.

FIG. 10 is a diagram illustrating a first example of a configuration of a variable delay circuit. A variable delay circuit 1000 illustrated in FIG. 10 can be applied to, for example, the delays 122 and 421 illustrated in FIGS. 1 and 4. It is assumed here that a driving signal is a differential signal.

The variable delay circuit 1000 includes input terminals 1011 and 1012, fixed delays 1021 to 1023, a differential amplifier circuits 1030 and 1040, a buffer 1050, and output terminals 1061 and 1062. A positive-phase signal of the driving signal is input to the input terminal 1011, whereas a negative-phase signal of the driving signal is input to the input terminal 1012.

The fixed delay 1021 delays the driving signals input from the input terminals 1011 and 1012 by a fixed amount of delay and outputs the delayed driving signals to the differential amplifier circuit 1030. The fixed delay 1022 delays the driving signals input from the input terminals 1011 and 1012 by a fixed amount of delay and outputs the delayed driving signals to the fixed delay 1023. The fixed delay 1023 delays the driving signals output from the fixed delay 1022 by a fixed amount of delay and outputs the delayed driving signals to the differential amplifier circuit 1040.

The differential amplifier circuit 1030 is of a long-tailed pair (LTP) type. More specifically, the differential amplifier circuit 1030 includes transistors 1031 and 1032, resistors 1033 and 1034, and a current source 1035. Each of the transistors 1031 and 1032 is, for example, a field-effect transistor (FET).

The positive-phase signal of the driving signal output from the fixed delay 1021 is applied to a gate of the transistor 1031. A drain of the transistor 1031 is coupled to the resistor 1033. A source of the transistor 1031 is coupled to the current source 1035. The negative-phase signal of the driving signal output from the fixed delay 1021 is applied to a gate of the transistor 1032. A drain of the transistor 1032 is coupled to the resistor 1034. A source of the transistor 1032 is coupled to the current source 1035.

An end of the resistor 1033 is coupled to the drain of the transistor 1031, whereas the other end thereof is coupled to a power source, not illustrated. Part between the transistor 1031 and the resistor 1033 serves as an output portion 1036 at which the positive-phase signal is output from the differential amplifier circuit 1030. One end of the resistor 1034 is coupled to the drain of the transistor 1032, whereas the other end thereof is coupled to the power source, not illustrated. Part between the transistor 1032 and the resistor 1034 serves as an output portion 1037 at which the negative-phase signal is output from the differential amplifier circuit 1030. One end of the current source 1035 is coupled to the transistors 1031 and 1032, whereas the other end thereof is grounded.

The differential amplifier circuit 1040 is of an LTP type. More specifically, the differential amplifier circuit 1040 includes transistors 1041 and 1042 and a current source 1043. Each of the transistors 1041 and 1042 is, for example, an FET.

The positive-phase signal of the driving signal output from the fixed delay 1023 is applied to a gate of the transistor 1041. A drain of the transistor 1041 is coupled to the output portion 1036. A source of the transistor 1041 is coupled to the current source 1043. The negative-phase signal of the driving signal output from the fixed delay 1023 is applied to a gate of the transistor 1042. A drain of the transistor 1042 is coupled to the output portion 1037. A source of the transistor 1042 is coupled to the current source 1043.

Part between the transistor 1041 and the output portion 1036 serves as an output portion 1044 at which the positive-phase signals output from the differential amplifier circuits 1030 and 1040 are combined and output to the buffer 1050. Part between the transistor 1042 and the output portion 1037 serves as an output portion 1045 at which the negative-phase signals output from the differential amplifier circuits 1030 and 1040 are combined and output to the buffer 1050. One end of the current source 1043 is coupled to the transistors 1041 and 1042, whereas the other end thereof is grounded.

The output portion 1044 is coupled to the output terminal 1061 through the buffer 1050. The positive-phase signal is output from the output terminal 1061. The output portion 1045 is coupled to the output terminal 1062 through the buffer 1050. The negative-phase signal is output from the output terminal 1062. In this way, the variable delay circuit 1000 can output the driving signals including the positive-phase signal and the negative-phase signal with the output terminals 1061 and 1062.

With the above configuration, the variable delay circuit 1000 can split the driving signals input from the input terminals 1011 and 1012, provide a delay difference to the split driving signals, combine the delayed driving signals, and output the driving signals from the output terminals 1061 and 1062. A ratio of a current value of the current source 1035 to a current value of the current source 1043 is adjustable, whereby a ratio of combining the driving signals can be changed. In this way, amounts of delay of the driving signals output from the output terminals 1061 and 1062 can be changed. When the driving signal is a single-ended signal, the driving signal can be delayed by a variable amount of delay by driving one side of the variable delay circuit 1000.

Figure 11A:
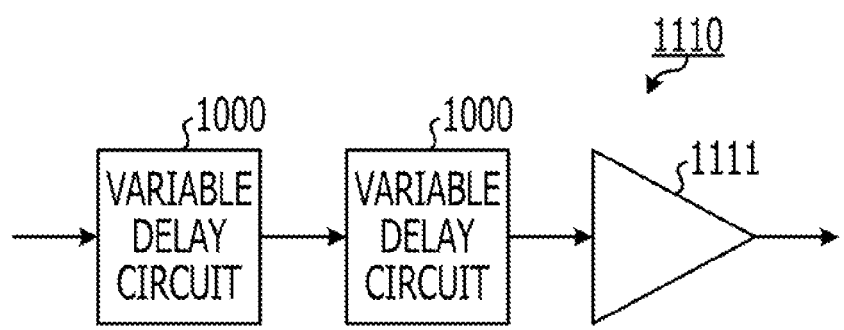
FIG. 11A is a diagram illustrating an example of simulation using the first example of the configuration of the variable delay circuit (part 1).
Figure 11B:
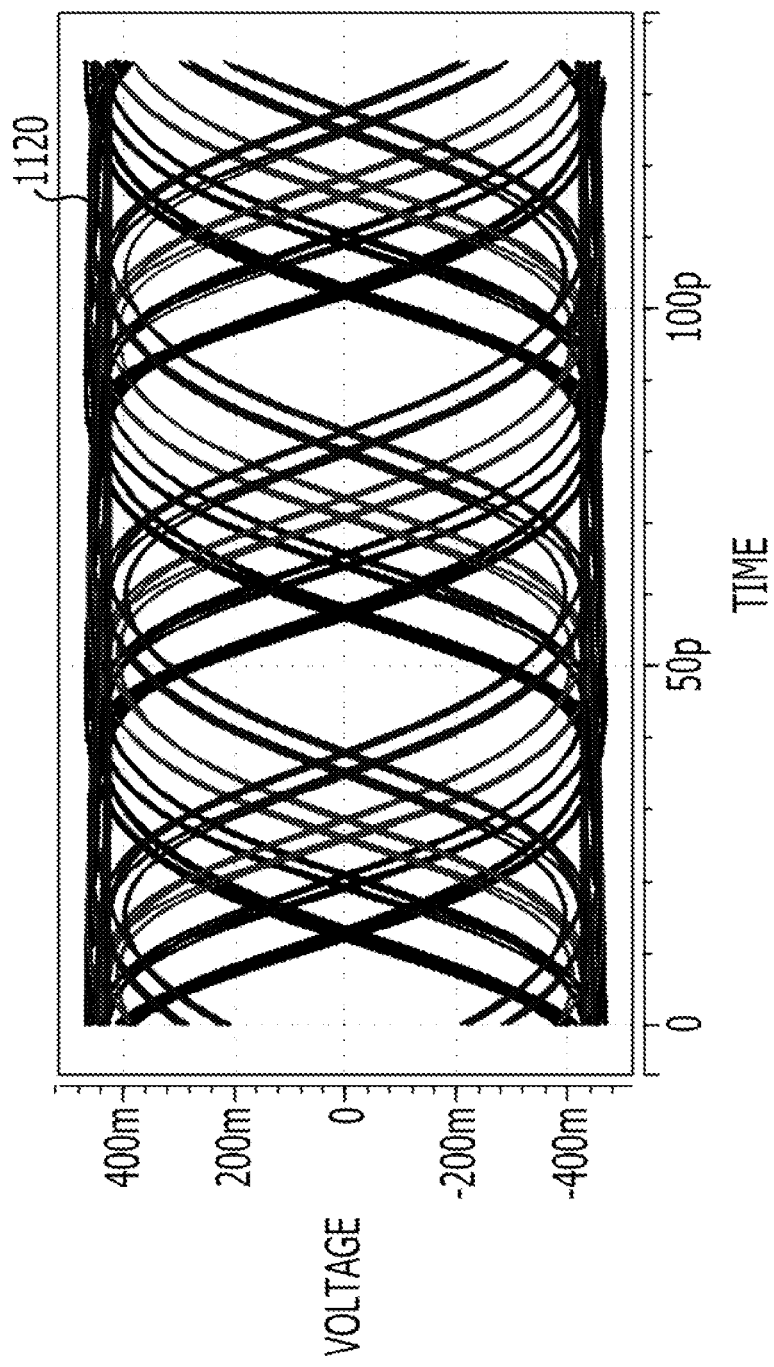
FIG. 11B is a diagram illustrating the example of the simulation using the first example of the configuration of the variable delay circuit (part 2).

FIGS. 11A and 11B are diagrams illustrating an example of simulation using the first example of the configuration of the variable delay circuit 1000. As illustrated in FIG. 11A, a variable delay 1110 includes two stages of the variable delay circuits 1000 illustrated in FIG. 10 and a buffer 1111. FIG. 11B illustrates an eye pattern 1120 of a simulation result of signals delayed by the variable delay 1110.

Figure 12:
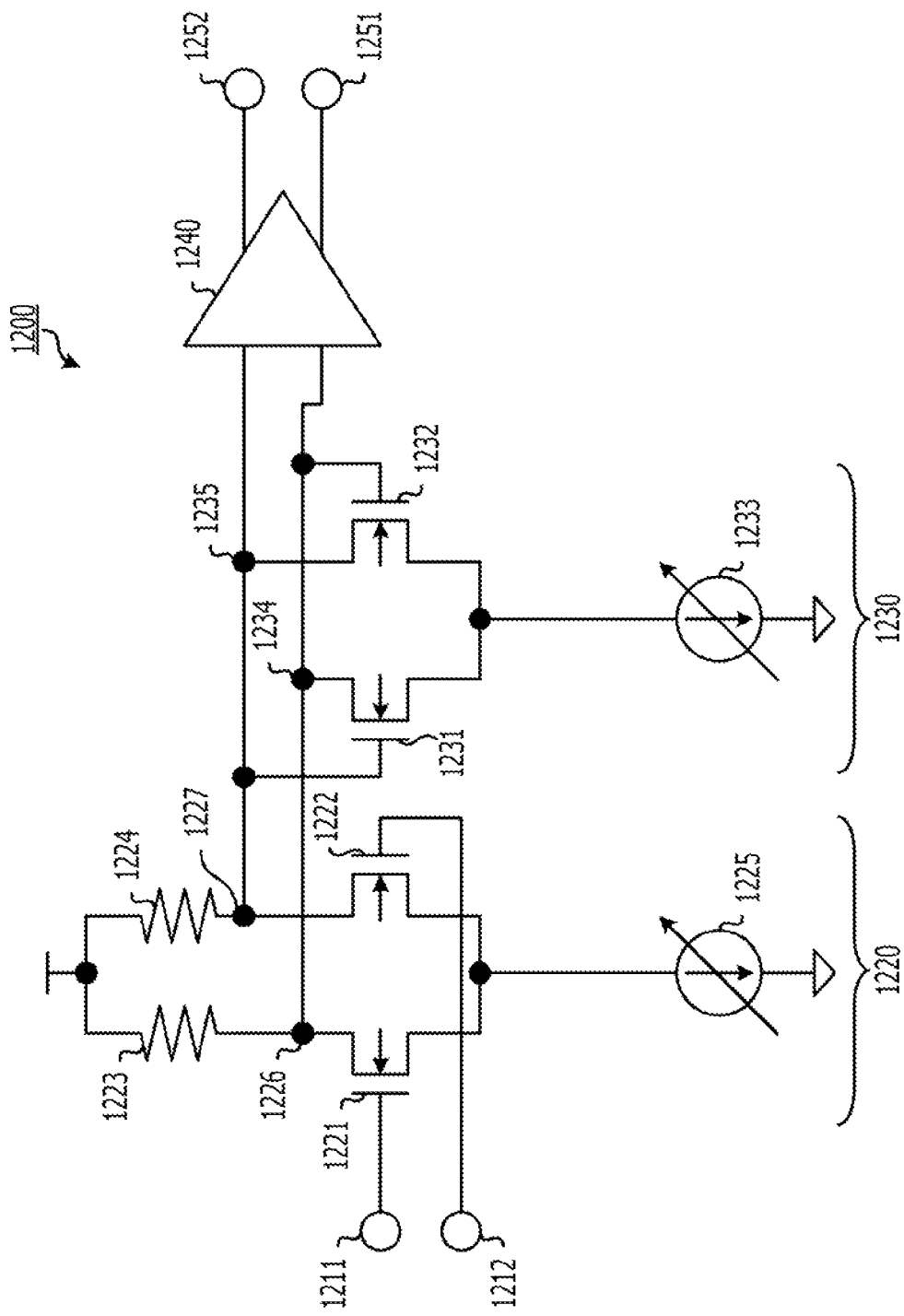
FIG. 12 is a diagram illustrating a second example of the configuration of a variable delay circuit.

FIG. 12 illustrates a second example of a configuration of a variable delay circuit. A variable delay circuit 1200 illustrated in FIG. 12 can be applied to, for example, the delays 122 and 421 illustrated in FIGS. 1 and 4. It is assumed here that a driving signal is a differential signal. The variable delay circuit 1200 includes input terminals 1211 and 1212, differential amplifier circuits 1220 and 1230, a buffer 1240, and output terminals 1251 and 1252. A positive-phase signal of the driving signal is input to the input terminal 1211, whereas a negative-phase signal of the driving signal is input to the input terminal 1212.

The differential amplifier circuit 1220 serves as a first amplifier circuit that variably amplifies a driving signal. More specifically, the differential amplifier circuit 1220 is of an LTP type. The differential amplifier circuit 1220 includes transistors 1221 and 1222, resistors 1223 and 1224, and a current source 1225. Each of the transistors 1221 and 1222 is, for example, an FET.

A gate of the transistor 1221 is coupled to the input terminal 1211. A drain of the transistor 1221 is coupled to the resistor 1223. A source of the transistor 1221 is coupled to the current source 1225. A gate of the transistor 1222 is coupled to the input terminal 1212. A drain of the transistor 1222 is coupled to the resistor 1224. A source of the transistor 1222 is coupled to the current source 1225.

One end of the resistor 1223 is coupled to the drain of the transistor 1221, whereas the other end thereof is coupled to a power source, not illustrated. Part between the transistor 1221 and the resistor 1223 serves as an output portion 1226 at which the positive-phase signal is output from the differential amplifier circuit 1220. One end of the resistor 1224 is coupled to a drain of the transistor 1222, whereas the other end is coupled to a power source, not illustrated. Part between the transistor 1222 and the resistor 1224 serves as an output portion 1227 at which the negative-phase signal is output from the differential amplifier circuit 1220. One end of the current source 1225 is coupled to the transistors 1221 and 1222, whereas the other end is grounded.

The differential amplifier circuit 1230 serves as a second amplifier circuit that variably amplifies the driving signals output from the differential amplifier circuit 1220 and feeds the amplified driving signals back to the differential amplifier circuit 1220. More specifically, the differential amplifier circuit 1230 is of an LTP type that utilizes some of the components of the differential amplifier circuit 1220 (e.g., the resistors 1223 and 1224 and the power source). The differential amplifier circuit 1230 includes transistors 1231 and 1232 and a current source 1233. Each of the transistors 1231 and 1232 is, for example, an FET.

A drain of the transistor 1231 is coupled to the output portion 1226. Part between the transistor 1231 and the output portion 1226 serves as an output portion 1234 at which the positive-phase signals output from the differential amplifier circuits 1220 and 1230 are output to the buffer 1240. A drain of the transistor 1232 is coupled to the output portion 1227. Part between the transistor 1232 and the output portion 1227 serves as an output portion 1235 at which the negative-phase signals are output from the differential amplifier circuits 1220 and 1230 to the buffer 1240.

A gate of the transistor 1231 is coupled to the output portion 1235. A source of the transistor 1231 is coupled to the current source 1233. A gate of the transistor 1232 is coupled to the output portion 1234. A source of the transistor 1232 is coupled to the current source 1233. With this configuration, the positive-phase signal output from the output portion 1234 of the differential amplifier circuit 1230 is fed back to the transistor 1221. Additionally, the negative-phase signal output from the output portion 1235 of the differential amplifier circuit 1230 is fed back to the transistor 1222.

The output portion 1234 is coupled to the output terminal 1251 through the buffer 1240. The positive-phase signal is output from the output terminal 1251. The output portion 1235 is coupled to the output terminal 1252 through the buffer 1240. The negative-phase signal is output from the output terminal 1252. With this configuration, the variable delay circuit 1200 can output the driving signals including the positive-phase signal and the negative-phase signal with the output terminals 1251 and 1252.

As described above, the differential amplifier circuit 1230 variably amplifies the driving signals output from the differential amplifier circuit 1220, switches the positive-phase signal and the negative-phase signal, and feeds the switched signals back to the differential amplifier circuit 1220. With this configuration, it is possible to cause the driving signals to go around the differential amplifier circuits 1220 and 1230, superpose the driving signals whose amounts of delay continuously change, and output the driving signals from the output terminals 1251 and 1252. Accordingly, the driving signals input to the variable delay circuit 1200 can be output after being delayed.

A ratio of the driving signal delayed by the differential amplifier circuit 1220 to the driving signal fed back by the differential amplifier circuit 1230 is changed by adjusting the current values of the current sources 1225 and 1233. Based on this, the amounts of delay of the driving signals output from the output terminals 1251 and 1252 can be changed. Even when the driving signal is a single-ended signal, it is possible to delay the driving signal by a variable amount of delay by driving one side of the variable delay circuit 1200.

Figure 13A:
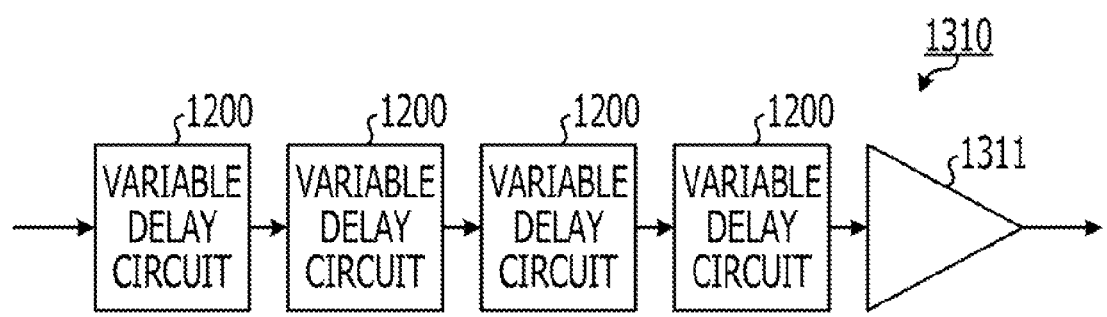
FIG. 13A is a diagram illustrating an example of simulation using the second example of the configuration of the variable delay circuit (part 1).
Figure 13B:
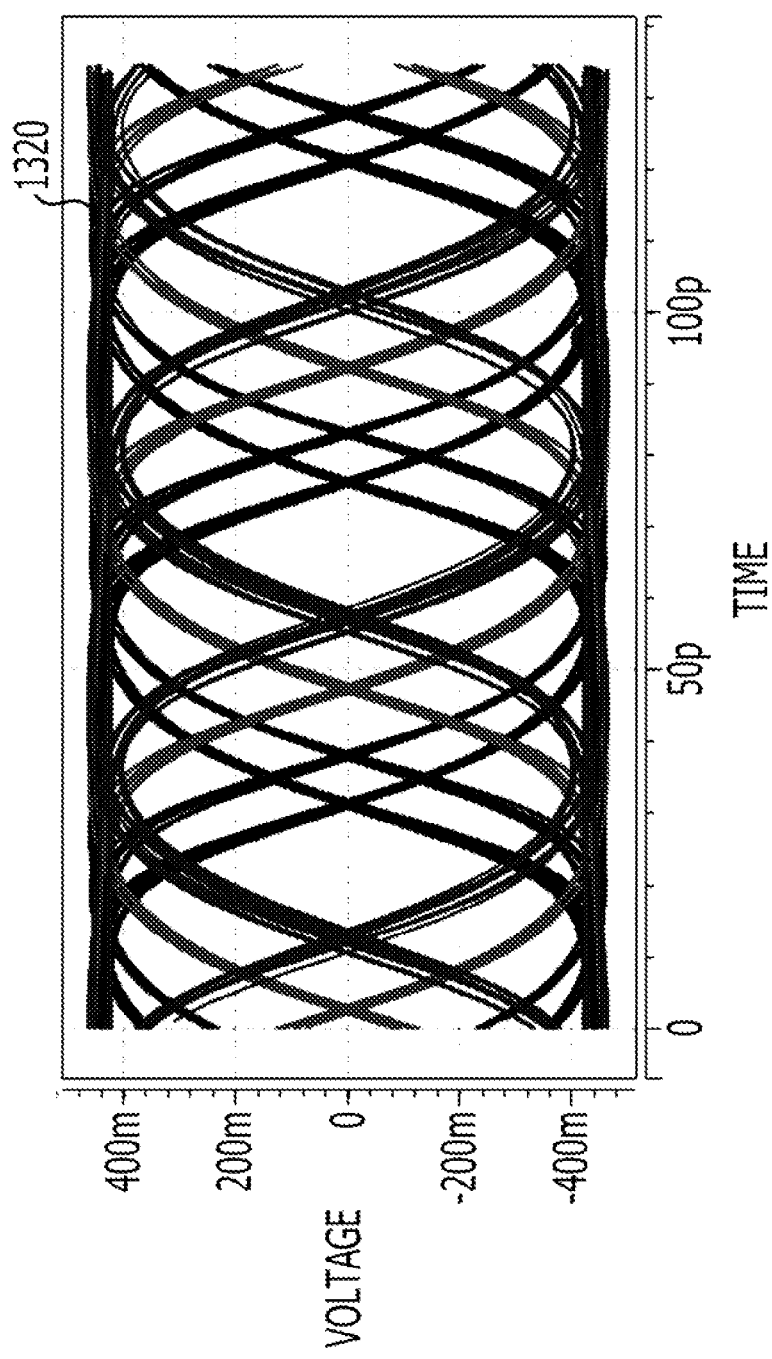
FIG. 13B is a diagram illustrating the example of the simulation using the second example of the configuration of the variable delay circuit (part 2).

FIGS. 13A and 13B are diagrams illustrating an example of simulation using the second example of the configuration of the variable delay circuit. As illustrated in FIG. 13A, a variable delay 1310 includes four stages of the variable delay circuits 1200 illustrated in FIG. 12 and a buffer 1311. FIG. 13B illustrates an eye pattern 1320 of a simulation result of signals delayed by the variable delay 1310. Here, four stages of the variable delay circuits 1200 are disposed in the variable delay 1310 so that an amount of delay equivalent to that of the variable delay 1110 illustrated in FIG. 11A is provided to the signals.

As illustrated by the eye pattern 1320 of FIG. 13B, the variable delay circuit 1200 illustrated in FIG. 12 can suppress jitter of the delayed signals compared to the variable delay circuit 1000 illustrated in FIG. 10. Since the variable delay circuit 1200 illustrated in FIG. 12 can suppress signal distortion compared to the variable delay circuit 1000 illustrated in FIG. 10 even when the number of stages is increased, a variable delay having a large variable range of an amount of delay can be realized.

For example, it is possible to increase the variable range of the amount of delay by realizing the delays 122 and 421 illustrated in FIG. 1 and FIG. 4 with a plurality of stages of the variable delay circuits 1200 even when the delays 122 and 421 are connected in parallel. In this way, the driving signals can be shaped more flexibly and a response characteristic of a target to be driven can be compensated.

Additionally, the variable delay circuit 1200 illustrated in FIG. 12 can be realized without the fixed delays 1021 to 1023 unlike the variable delay circuit 1000 illustrated in FIG. 10. Accordingly, a scale of the variable delay circuit 1200 illustrated in FIG. 12 can be decreased compared to the variable delay circuit 1000 illustrated in FIG. 10.

Figure 14:
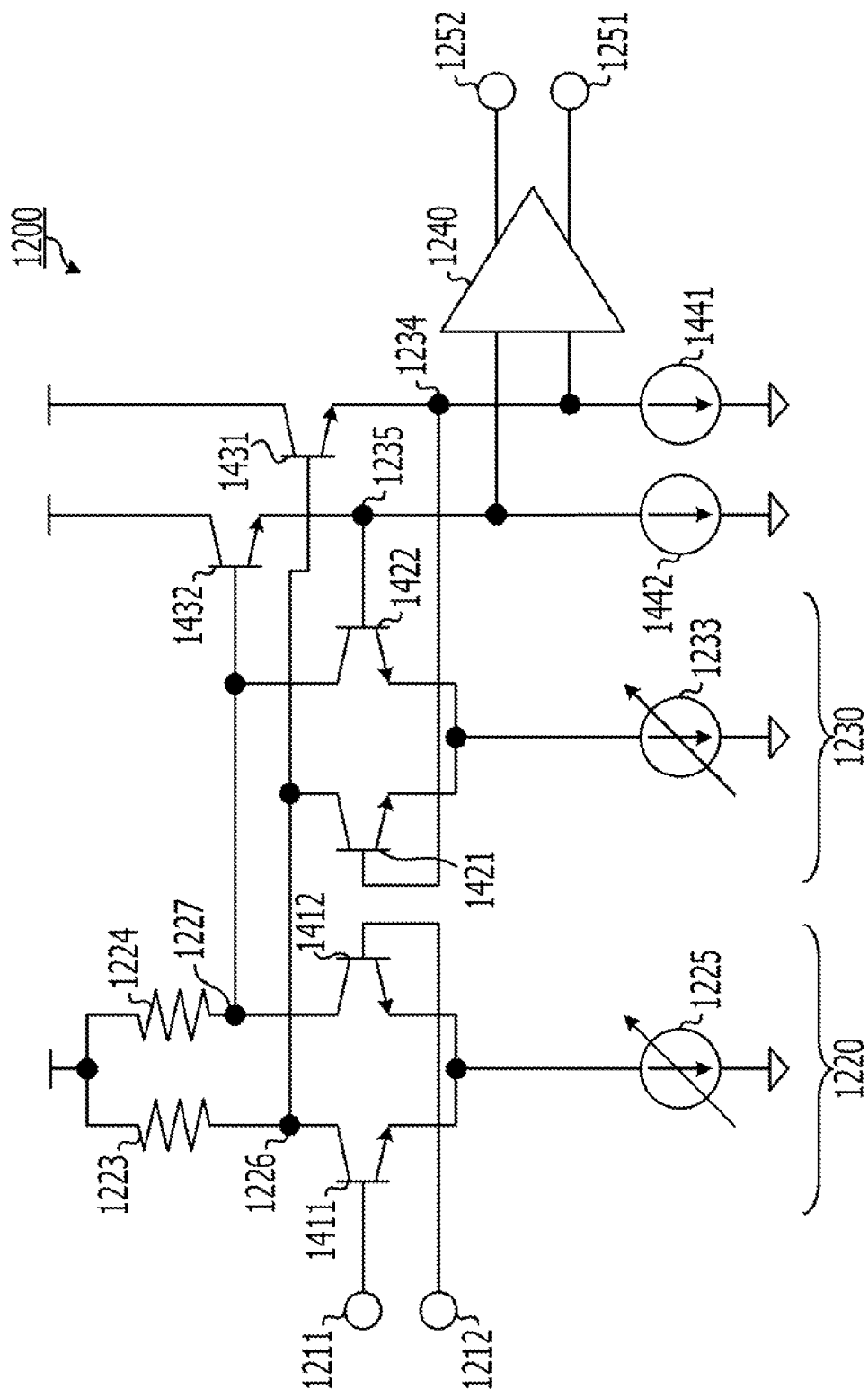
FIG. 14 is a diagram illustrating a modification of the variable delay circuit having the second example of the configuration.

FIG. 14 is a diagram illustrating a modification of the variable delay circuit 1200 according to the second configuration example. Referring to FIG. 14, like references are attached to a configuration similar to that illustrated in FIG. 12 and a description thereof is omitted. A variable delay circuit 1200 illustrated in FIG. 14 corresponds to the variable delay circuit 1200 illustrated in FIG. 12 realized with bipolar junction transistors (BJTs). As illustrated in FIG. 14, the variable delay circuit 1200 includes input terminals 1211 and 1212, differential amplifier circuits 1220 and 1230, transistors 1431 and 1432, current sources 1441 and 1442, a buffer 1240, and output terminals 1251 and 1252.

The differential amplifier circuit 1220 includes transistors 1411 and 1412 instead of the transistors 1221 and 1222 illustrated in FIG. 12, respectively. Each of the transistors 1411 and 1412 is a BJT.

A base of the transistor 1411 is coupled to the input terminal 1211. A collector of the transistor 1411 is coupled to a resistor 1223. An emitter of the transistor 1411 is coupled to a current source 1225. A base of the transistor 1412 is coupled to the input terminal 1212. A collector of the transistor 1412 is coupled to a resistor 1224. An emitter of the transistor 1412 is coupled to the current source 1225.

One end of the resistor 1223 is coupled to the collector of the transistor 1411, whereas the other end thereof is coupled to a power source, not illustrated. Part between the transistor 1411 and the resistor 1223 serves as an output portion 1226 at which the positive-phase signal is output from the differential amplifier circuit 1220. One end of the resistor 1224 is coupled to the collector of the transistor 1412, whereas the other end is coupled to the power source, not illustrated. Part between the transistor 1412 and the resistor 1224 serves as an output portion 1227 at which the negative-phase signal is output from the differential amplifier circuit 1220. One end of the current source 1225 is coupled to the transistors 1411 and 1412, whereas the other end is grounded.

A base of the transistor 1431 is coupled to the output portion 1226. A collector of the transistor 1431 is coupled to a power source, not illustrated. An emitter of the transistor 1431 is coupled to the current source 1441 and the buffer 1240. A base of the transistor 1432 is coupled to the output portion 1227. A collector of the transistor 1432 is coupled to a power supply, not illustrated. An emitter of the transistor 1432 is coupled to the current source 1442 and the buffer 1240.

Part between the transistor 1431 and the current source 1441 serves as an output portion 1234 at which the positive-phase signals output from the differential amplifier circuits 1220 and 1230 are combined and output to the buffer 1240. Part between the transistor 1432 and the current source 1442 serves as an output portion 1235 at which the negative-phase signals output from the differential amplifier circuits 1220 and 1230 are combined and output to the buffer 1240.

The differential amplifier circuit 1230 includes transistors 1421 and 1422 instead of the transistors 1231 and 1232 illustrated in FIG. 12, respectively. Each of the transistors 1421 and 1422 is a BJT. A collector of the transistor 1421 is coupled to the base of the transistor 1431. A base of the transistor 1421 is coupled to the output portion 1234. An emitter of the transistor 1421 is coupled to the current source 1233. A collector of the transistor 1422 is coupled to the base of the transistor 1432. A base of the transistor 1422 is coupled to the output portion 1235. An emitter of the transistor 1422 is coupled to the current source 1233.

As described above, the positive-phase signal output from the output portion 1234 of the differential amplifier circuit 1230 is fed back to the transistor 1421 as input of the positive-phase signal of the differential amplifier circuit 1230. Additionally, the negative-phase signal output from the output portion 1235 of the differential amplifier circuit 1230 is fed back to the transistor 1422 as input of the negative-phase signal of the differential amplifier circuit 1230.

With the above configuration, jitter of delayed signals can be suppressed like the variable delay circuit 1200 illustrated in FIG. 12. Since signal distortion can be suppressed even when the number of stages is increased, a variable delay having a large variable range of the amount of delay can be realized. Additionally, a scale of the circuit can be decreased compared to the variable delay circuit 1000 illustrated in FIG. 10.

Modification of Driver

Figure 15:
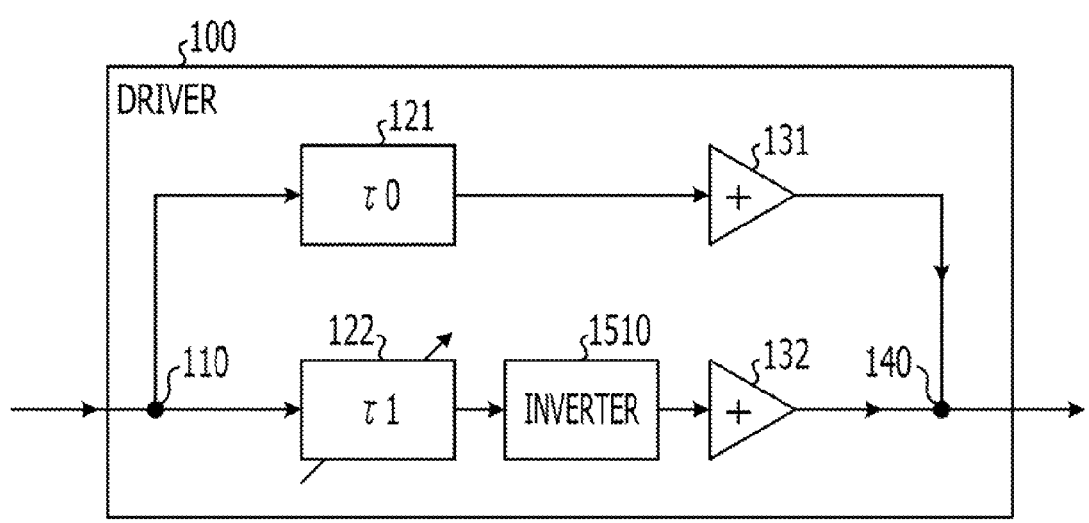
FIG. 15 is a diagram illustrating a modification of the driver.

FIG. 15 is a diagram illustrating a modification of a driver. Referring to FIG. 15, like references are attached to a configuration similar to that illustrated in FIG. 1 and a description thereof is omitted. An amplifier 132 illustrated in FIG. 15 is a non-inverting amplifier (+) that amplifies a driving signal output from a delay 122 without inverting the signal. A driver 100 illustrated in FIG. 15 also includes an inverter 1510 in addition to the configuration illustrated in FIG. 1. The inverter 1510 inverts the driving signal output from a delay 122 to the amplifier 132. With this configuration, the driving signal input from the amplifier 132 to a combiner 140 can be inverted even when the amplifier 132 is a non-inverting amplifier.

Although the configuration in which the inverter 1510 is disposed upstream of the amplifier 132 has been described here, the inverter 1510 may be disposed downstream of the amplifier 132. Additionally, the inverter 1510 may be disposed between a splitter 110 and the delay 122 or may be disposed upstream or downstream of an amplifier 131. Additionally, the inverter 1510 may be disposed between the splitter 110 and a delay 121.

In addition, both the amplifier 131 and the amplifier 132 may be inverting amplifiers (−) in the driver 100 illustrated in FIG. 15. In this case, the driving signal inverted by the inverter 1510 is again inverted by the amplifier 132 to be a non-inverted signal. Accordingly, an inverted driving signal and a non-inverted driving signal are input to the combiner 140 from the amplifiers 131 and 132, respectively.

As described above, the inverter 1510 for inverting at least one of split driving signals is provided. With this configuration, inverted and non-inverted driving signals can coexist among those input to the combiner 140. Accordingly, waveforms of the driving signals can be flexibly shaped by switching order of the driving signals.

Additionally, an inverter for inverting at least one of split driving signals may be realized by using a non-inverting amplifier as the amplifier 132 as illustrated in FIG. 1 and FIG. 2 or may be realized by providing the inverter 1510. Although the driver 100 illustrated in FIG. 1 has been described here, the same applies to the driver 100 illustrated in FIG. 4.

Adjustment of Driving Signals

Adjustment of amounts of delay in the driver 100 will now be described. The amounts of delay τ0, τ1, and τ2 in the driver 100 are changed through an operation of an adjustor (e.g., a user) of the driver 100. For example, the adjustor connects a measuring instrument for measuring an optical signal output from the light-emitting element 710 to the optical transmission apparatus 700 to measure a waveform or an eye pattern of the optical signal. The adjustor then adjusts the amounts of delay τ0, τ1, and τ2, gains of the amplifiers 131, 132, and 431, and so forth in the driver 100 so that the measured waveform or eye pattern is in a desired form. In this way, transmission characteristics of the optical signal can be improved. The driver can be realized not only by an analog circuit but also by a digital circuit, a field-programmable gate array (FPGA), and a processor.

As described above, response characteristics of a target to be driven can be flexibly compensated in accordance with the driver and the optical transmission apparatus.

In accordance with the disclosed driver and optical transmission apparatus, response characteristics of a target to be driven can be advantageously compensated flexibly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the invention have been described in detail, it should be understood that the various changes, substitutions, and alterations could be made hereto without departing from the spirit and scope of the invention.

What is claimed is:

1. A driver circuit comprising:
   a plurality of delay circuits that delay branched driving signals; and
   an inverter that inverts at least one of the branched driving signals, wherein
   at least one of the plurality of delay circuits is at least one variable delay circuit delaying a variable amount of delay, and
   an output driving signal is output by combining the at least one inverted signal of the branched driving signal output via the inverter and at least one non-inverted signal of the branched driving signals output from the delay circuits, wherein the at least one variable delay circuit includes:
   a first amplifier circuit, connected to a voltage supply and a first current source, that variably amplifies one of branched driving signals; and
   a second amplifier circuit, connected to the voltage supply and a second current source, that variably amplifies one of the branched driving signals output from the first amplifier circuit and feeds the amplified driving signal back to the first amplifier circuit.

2. The driver circuit according to claim 1, further comprising:
   an adder circuit that adds the at least one inverted signal of the branched driving signal output via the inverter and the at least one non-inverted signal of the branched driving signals output from the delay circuits, wherein
   an output driving signal is output by the adder circuit.

3. The driver circuit according to claim 1, wherein the inverter is an inverting amplifier circuit that inverts and amplifies at least one of the branched driving signals.

4. The driver circuit according to claim 1, wherein the at least one variable delay circuit has a variable range of the amount of delay with which order of the branched driving signals to be combined can be switched.

5. The driver circuit according to claim 1, wherein the branched driving signals include three or more branched driving signals.

6. The driver circuit according to claim 1, wherein at least another one of the plurality of delay circuits is at least one variable delay circuit delaying a fixed amount of delay.

7. An optical transmission apparatus comprising:
   a plurality of delay circuits that delay branched driving signals;
   an inverter that inverts at least one of the branched driving signals; and
   a laser diode that outputs an optical signal based on a driving signal resulting from combining the inverted signal of the branched driving signal output via the at least one inverter and at least one non-inverted signal of the branched driving signals output from the delay circuits, wherein
   at least one of the plurality of delay circuits is at least one variable delay circuit delaying a variable amount of delay,
   wherein the variable delay circuit includes:
   a first amplifier circuit, connected to a voltage supply and a first current source, that variably amplifies one of branched driving signals; and
   a second amplifier circuit, connected to the voltage supply and a second current source, that variably amplifies one of the branched driving signals output from the first amplifier circuit and feeds the amplified driving signal back to the first amplifier circuit.

8. The optical transmission apparatus according to claim 7, further comprising:
   an adder circuit that adds the at least one inverted signal of the branched driving signal output via the inverter and the at least one non-inverted signal of the branched driving signals output from the delay circuits, wherein
   an output driving signal is output by the adder circuit.

9. The optical transmission apparatus according to claim 7, wherein the inverter is an inverting amplifier circuit that inverts and amplifies one of the at least one branched driving signals.

10. The optical transmission apparatus according to claim 7, wherein the variable delay circuit has a variable range of the amount of delay with which order of the branched driving signals to be combined can be switched.

11. The optical transmission apparatus according to claim 7, wherein the branched driving signals include three or more branched driving signals.

12. The optical transmission apparatus according to claim 7, wherein at least another one of the plurality of delay circuits is at least one variable delay circuit delaying a fixed amount of delay.

* * * * *